Sept. 7, 1937.    D. T. MITCHELL    2,092,466
RADIO TUBE SOCKET
Filed Aug. 29, 1936
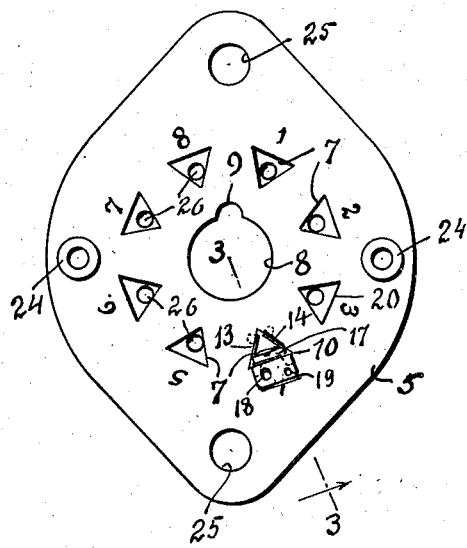
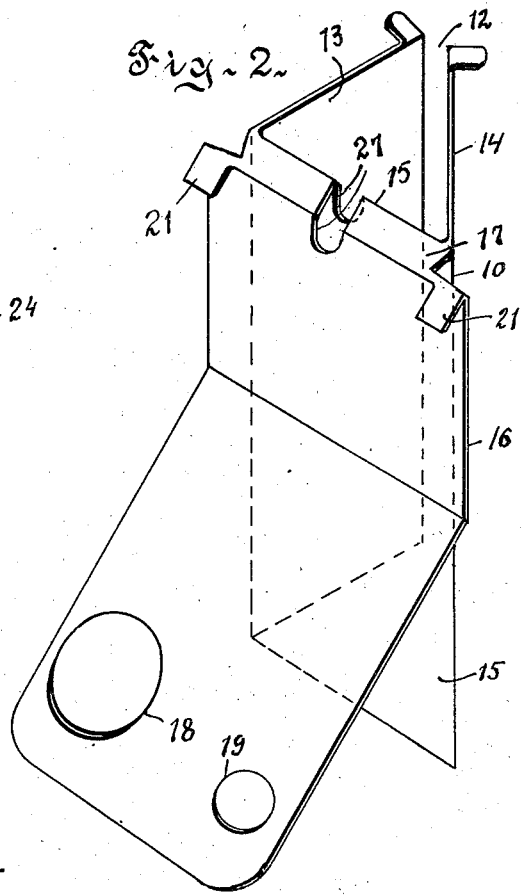
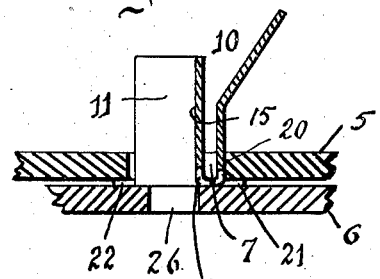
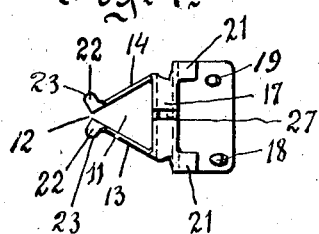
INVENTOR
D. T. Mitchell
BY
his ATTORNEY Patented Sept. 7, 1937

2,092,466

UNITED STATES PATENT OFFICE 2,092,466

RADIO TUBE SOCKET

Douglas T. Mitchell, New York, N. Y.

Application August 29, 1936, Serial No. 98,442

3 Claims. (Cl. 173—328)

My invention relates to improvements in radio sockets, and its object is to produce a socket that can be assembled economically, by mounting the prong contact and the soldering lug thereof through the same hole of the insulated plate.

Another object of the invention is to provide a socket in which the prong contact and the soldering lug are so arranged that solder is prevented from running into the contact when solder is applied to the lug.

A further object of the invention is to arrange the prong contact and the soldering lug thereof so as to provide a good frictional contact for the prong of the tube without diminishing the rigid connection between the prong contact and the soldering lug.

Referring to the drawing, Figure 1 is a bottom-up plan of a socket embodying my invention, in which all the prong contacts have been removed except one.

Figure 2 is a perspective view of a prong contact.

Figure 3 is a section on line 3—3, Figure 1, and

Figure 4 is a plan of the base end of the prong contact.

Referring to the drawing, 5 and 6 are plates of insulated material of identical configuration. The plate 5 is provided with a plurality of triangular apertures 7 disposed circumferentially and symmetrically to the radii of a central opening 8. Said opening 8 has a notch 9 for the proper position of a radio tube in the socket.

Engaging the triangular openings 7 are prong contacts 10, best shown in Figures 2, 3, and 4. The prong contact 10 is formed of a slitted triangularly shaped tube 11 and a soldering lug 16 united to the tube by a bridge 17. The slit 12 of the tube 11 is formed at the edge of the tube by the two sides or walls 13 and 14. The back side or wall 15 opposite the slit 12 is united to the soldering lug 16 by the bridge 17 previously referred to, the said bridge maintaining the tube and the lug in spaced relation.

A portion of the lug 16 extending beyond the tubular portion of the contact 10 is deflected or bent from said tubular part to facilitate the attaching thereto of wires for which apertures 18 and 19 are provided in said lug 16.

When the contact 10 is engaged into the triangular opening 7 of the plate 5, the lug 16 at the bridge 17 is made to engage the side 20 of the triangular opening 7 which is remote from the center, while the walls 13 and 14 of the tubular contact 11 will be located at the two other sides of the said opening 7 with a slight clearance therewith.

The lug 16 at the bridge 17 has flanges 21 which are adapted to rest between plates 5 and 6. A flange 22 is also provided on each of the walls 13 and 14 at the slit 12. The said flanges are formed to lie substantially in the same plane with flanges 21 and are therefore also located between the said plates 5 and 6.

The flanges 22 have rounded edges 23 to prevent sparking between the flanges of proximate prong contacts located in the adjacent opening 7. The flanges 21 and 22 located between the plates 5 and 6, secure the prong contacts between said plates when said plates are attached together by eyelets 24. In addition, the plates have openings 25, by means of which they are secured to a chassis. This means of attachment also serves as an additional means for securing the contact between the plates 5 and 6.

The plate 6 is provided with openings 26, registering with the triangular opening 7, and through which openings the prongs of a radio tube pass into the slitted tubular contacts 11 located between the plates as described.

To insure a perfect contact between the prong of a radio tube and the triangular tube 11 of the contact 10, the back wall 15 of the tube 11 and the bridge 17 has a cut-out 27 which permits the back wall 15 to flex when a prong is forced into the slitted triangular tube 11. Thus, the triangular slitted tube 11 provides a three-sided frictional contact. The two sides 13 and 14 are permitted to flex, due to the provision of the slit 12 between the said sides. In addition, the back wall 15 or side 16 is permitted to flex due to the provision of the cut-out 27.

By providing a bridge 17 between the soldering lug 16 and the back wall 15 of the tubular contact, any excess solder that may run off the lug 16 is prevented from entering the inside of the tubular contact 11 by said bridge 17, for said bridge permits the solder to accumulate thereat between the facing sides of the lug and the wall 15 of the tubular contact 11.

By making the contact with four flanges as described, at the point where it is to be attached to the socket, I provide a four-point rest or suspension for my prong contact. In consequence of such a suspension, I can engage both the tubular contact and its soldering lug through the same opening of the plate, which is a more economical method than the one in which the tubular part and the soldering lug are threaded through independent openings, by mounting the prong contact and soldering lug through the same opening in the insulated plate. Thus, there is a saving in tool construction for the plate with less possibility of breaking of tool parts.

To facilitate the soldering of the proper wires to the proper lugs, the triangular openings which accommodate the contacts with the lugs are numbered consecutively, as indicated in Figure 1.

I claim:

1. A radio socket comprising an insulated plate having a plurality of triangular openings circumferentially disposed thereon, a second insulated plate of similar contour having circular openings therein registering with the triangular openings of the first plate, a prong contact having a triangular slitted tubular part, a soldering lug and a bridge connecting the lug to the tubular part and spacing it therefrom, said lug and tubular part having flanges for engaging between said plates, so that the lug at the bridge engages one of the sides of a triangular opening in the plate, while the other two sides of the tubular part not connected to the lug by the bridge are at the other two sides of the triangular openings, and means for securing the plates together which also secure the contacts to the plates.

2. A radio socket comprising an insulated plate having a plurality of triangular openings circumferentially disposed thereon, a second insulated plate of similar contour having circular openings thereon registering with the triangular openings of the first plate, a contact for each of said openings comprising a triangular slitted tubular part, a soldering lug and a bridge connecting the lug to the tubular part and spacing it therefrom, said lug and tubular part having flanges engaging between said plates when said contact with the lug is positioned in a triangular opening, said contact having a cut-out in the tubular part thereof at the bridge, and means for connecting the plates together whereby the contacts are connected to the plates.

3. In a radio socket, an insulated plate having a plurality of triangular openings circumferentially disposed thereon, a second insulated plate of similar contour having circular openings therein registering with the triangular openings of the first plate, a contact for each of said triangular openings comprising a triangular tubular portion slitted at the meeting edges of the two sides thereof, a soldering lug and a bridge uniting the soldering lug to the side of the triangular tubular portion which faces the slit and maintaining said lug in spaced relation therefrom, said lug adapted to engage at the bridge one side of the triangular opening when a contact is inserted therein, flanges on the lug at the bridge, and rounded flanges at the slit on the side of the triangular tubular portion of the contact in a plane with the flanges on the lug, said flanges adapted to be located between the plates, and means for securing said plates together whereby the contacts are secured to the plates.

DOUGLAS T. MITCHELL.